US006705601B2

(12) United States Patent
Baur et al.

(10) Patent No.: US 6,705,601 B2
(45) Date of Patent: Mar. 16, 2004

(54) SELF-COMPENSATING SPIRAL SPRING FOR A MECHANICAL BALANCE-SPIRAL SPRING OSCILLATOR

(75) Inventors: Jacques Baur, Genolier (CH); François Paschoud, Montherod (CH); Patrick Sol, Chanay (FR)

(73) Assignee: Rolex S.A., Geneva (CH)

( * ) Notice: Subject to any disclaimer, the term of this patent is extended or adjusted under 35 U.S.C. 154(b) by 2 days.

(21) Appl. No.: 10/139,526

(22) Filed: May 6, 2002

(65) Prior Publication Data

US 2002/0180130 A1 Dec. 5, 2002

(30) Foreign Application Priority Data

May 18, 2001 (EP) ........................................... 01810497

(51) Int. Cl.[7] .......................... F16F 1/00; G09B 17/00; C21D 11/00

(52) U.S. Cl. ....................... 267/157; 368/169; 148/501; 148/672

(58) Field of Search ................................ 267/156, 157; 368/169; 148/501, 672

(56) References Cited

U.S. PATENT DOCUMENTS

| | | | | |
|---|---|---|---|---|
| 3,183,085 A | | 5/1965 | France et al. | |
| 5,881,026 A | * | 3/1999 | Baur et al. | 368/169 |
| 6,329,066 B1 | * | 12/2001 | Baur et al. | 428/472.1 |
| 6,503,341 B2 | * | 1/2003 | Baur et al. | 148/241 |

FOREIGN PATENT DOCUMENTS

| | | |
|---|---|---|
| CH | 551302 | 2/1970 |
| CH | 557557 | 2/1970 |
| DE | 1558816 | 3/1972 |
| EP | 0 886 195 | 12/1998 |
| GB | 892327 | 3/1962 |
| GB | 1166701 | 10/1969 |

* cited by examiner

*Primary Examiner*—Robert A. Siconolfi
(74) *Attorney, Agent, or Firm*—Sturn & Fix LLP

(57) ABSTRACT

This self-compensating spiral spring for a mechanical balance-spiral spring oscillator for a watch or clock movement or other precision instrument, made of an Nb—Hf paramagnetic alloy possessing a thermal coefficient of Young's modulus (TCE), such that it enables the following expression to be substantially equal to zero:

$$\frac{1}{E}\frac{dE}{dT} + 3\alpha_s - 2\alpha_b$$

where:

E: Young's modulus of the spiral spring of the oscillator;

$$\frac{1}{E}\frac{dE}{dT} = TCE = \text{thermal coefficient of Young's modulus of the spiral spring of the oscillator;}$$

$\alpha_s$: thermal expansion coefficient of the spiral spring of the oscillator;

$\alpha_b$: thermal expansion coefficient of the balance the oscillator.

contains between 2 at % and 30 at % Hf.

4 Claims, 1 Drawing Sheet

SELF-COMPENSATING SPIRAL SPRING FOR A MECHANICAL BALANCE-SPIRAL SPRING OSCILLATOR

BACKGROUND OF THE INVENTION

1. Field of the Invention

The present invention relates to a self-compensating spiral spring for a mechanical balance-spiral spring oscillator for a watch or clock movement or other precision instrument, made of an Nb—Hf paramagnetic alloy possessing a positive thermal coefficient of Young's modulus (TCE), capable of compensating for the thermal expansion of both the spiral spring and the balance.

2. Description of the Related Art

All the methods proposed for compensating for these frequency variations are based on the consideration that this natural frequency depends exclusively on the ratio of the constant of the restoring torque exerted by the spiral spring on the balance to the moment of inertia of the latter, as indicated in the following equation:

$$F = \frac{1}{2\pi}\sqrt{\frac{C}{I}} \qquad (1)$$

where

F=natural frequency of the oscillator;

C=constant of the restoring torque exerted by the oscillator's spiral spring;

I=moment of inertia of the oscillator's balance.

Since the discovery of alloys based on Fe—Ni possessing a positive thermal coefficient of Young's modulus (hereafter called TCE), the thermal compensation of the mechanical oscillator is obtained by adjusting the TCE of the spiral spring according to the thermal expansion coefficients of the spiral spring and of the balance. This is because, by expressing the torque and the inertia on the basis of the characteristics of the spiral spring and the balance, and then differentiating equation (1) with respect to temperature, the relative thermal variation in the natural frequency is obtained, namely:

$$\frac{1}{F}\frac{dF}{dT} = \frac{1}{2}\left(\frac{1}{E}\frac{dE}{dT} + 3\alpha_s - 2\alpha_b\right) \qquad (2)$$

where:

E: Young's modulus of the spiral spring of the oscillator;

$$\frac{1}{E}\frac{dE}{dT} = TCE = \text{thermal coefficient of Young's modulus of the spiral spring of the oscillator;}$$

$\alpha_s$: thermal expansion coefficient of the spiral spring of the oscillator;

$\alpha_b$: thermal expansion coefficient of the balance the oscillator.

By adjusting the self-compensation term $$A = \frac{1}{2}(TCE + 3\alpha_s)$$

to the value of the thermal expansion coefficient of the balance, it is possible to make equation (2) equal to zero. Thus, the thermal variation in the natural frequency of the mechanical oscillator can be eliminated.

The thermal expansion coefficient $\alpha_b$ of the materials for balances most often used, such as alloys of copper, of silver, of gold, of platinum or of steel, lie within a range of about 10 to 20 ppm/° C. To compensate for the effects of the temperature variations on the natural frequency of the oscillators due to their expansion, the alloys for spiral springs must therefore have a corresponding self-compensation term. The desired accuracy of watches means that the self-compensation term must be able to be controllably adjusted in manufacture with a tolerance of a few ppm/° C. about the desired value.

The ferromagnetic alloys based on iron, nickel or cobalt currently used for manufacturing spiral springs possess an abnormally positive TCE within an approximately 30° C. range around room temperature, due to the proximity of their Curie temperature. Near this temperature, the magnetostrictive effects which decrease the Young's modulus of these alloys disappear, resulting in an increase in the modulus. Apart from the fact that this temperature range is relatively narrow, these alloys are sensitive to the effects of magnetic fields. The latter modify the elastic properties of spiral springs in an irreversible manner and consequently change the natural frequency of the mechanical oscillator. Furthermore, the elastic properties of ferromagnetic alloys vary with the degree of cold working, which means that this parameter has to be precisely controlled during manufacture of the spiral spring.

The desired TCE values of spiral springs produced from this family of alloys are adjusted by a precipitation heat treatment which also fixes the final shape of the spiral spring by relaxation.

As an alternative to ferromagnetic alloys for the manufacture of precision springs and self-compensating spiral springs, paramagnetic alloys having a high magnetic susceptibility and a negative thermal coefficient of susceptibility have already been proposed in CH-551 032 (D1) , in CH-557 557 (D2) and in DE-C3-15 58 816 (D3). These alloys possess an abnormally positive TCE and have the advantage of having elastic properties which are insensitive to magnetic fields. Their elastic properties depend on the texture created during the drawing of the spiral spring, but little on the deformation ratio, unlike ferromagnetic alloys. In addition, as mentioned in document D3, these alloys offer a thermal compensation range for mechanical oscillators which extends over more than 100° C. about room temperature.

The physical causes which create the abnormally positive TCE of these paramagnetic alloys are explained in the abovementioned documents. According to the latter, these alloys possess a high density of electron states at the Fermi level and strong electron-phonon coupling, thereby producing this abnormal behavior of the TCE.

In particular, document D3 cites, as being suitable for the manufacture of oscillator spiral springs of watch or clock movements, alloys in which Nb or Ta is alloyed with Zr, with Ti or with Hf which are found in these alloys in proportions such that they are capable of precipitating in two phases.

Furthermore, EP 0 886 195 (D4) proposes an Nb—Zr alloy containing between 5% and 25% by weight of Zr and at least 500 ppm by weight of a doping agent at least partly formed from oxygen. With this alloy, the TCE is controlled by the texture. The participation which occurs during the fixing process induces recrystallization which modifies the texture and allows the TCE to be adjusted. Oxygen has an influence on the precipitation and the crystallization, and therefore on the TCE.

Adjustment of the TCE during the fixing operation is difficult to control. This is because the texture which controls the TCE is modified by the recrystallization during the fixing operation. Now, in Nb—Zr—O alloys, the initiation of recrystallization and its development depend on the oxygen concentration, on the deformation ratio and on temperature. With these alloys, it has been found that the temperature range over which recrystallization develops is very narrow (approximately 50° C.). In addition, the induced variation in TCE between the start and end of recrystallization is large, about 150 ppm° C. The narrow temperature range within which recrystallization develops and this large variation in TCE mean that it is difficult to make the TCE adjustment of Nb—Zr—O alloys reproducible. The narrowness of this temperature range is due to the fact that this reaction is initiated by the participation of Zr-rich phases from the solid solution.

Although document D3 is based on the ability of the components of the alloy to precipitate in two phases, the spring with an abnormally positive TCE is manufactured from the alloy annealed at high temperature and then rapidly cooled so as to obtain a supersaturated solid solution. In this state, the alloy then undergoes cold deformation with a deformation ratio of more than 85%. This high degree of deformation induces a texture favorable to a positive TCE. To adjust the TCE to the desired value, the alloy is finally heat treated within a temperature interval which allows precipitation from the supersaturated solid solution. The phases which precipitate from the solid solution have lower TCEs, which results in a decrease in the overall TCE and allows it to be adjusted to the desired value. The recrystallization after two-phase precipitation is relatively difficult to control. Furthermore, in the case of Hf, the proportion of Hf must be greater than 30 at %, since up to this concentration this element is in solid solution in the Nb. Hence the deformability is thereby reduced.

BRIEF SUMMARY OF THE INVENTION

The object of the present invention is to obtain an alloy which makes it possible to remedy, at least partly, the drawbacks of the abovementioned alloys.

Surprisingly, it has been discovered that Nb—Hf alloys having very low proportions of Hf, that is to say proportions which lie well below the limit above which Hf precipitates, allow a positive TCE to be obtained, this limit being lowered down to 2 at %.

The subject of the invention is consequently a self-compensating spiral spring for a mechanical balance-spiral spring oscillator for a watch or clock movement or other precision instrument, made of an Nb—Hf paramagnetic alloy possessing a positive thermal coefficient of Young's modulus (TCE), which is able to compensate for the thermal expansion both of the spiral spring and the balance.

DETAILED DESCRIPTION OF THE INVENTION

Figure 1:
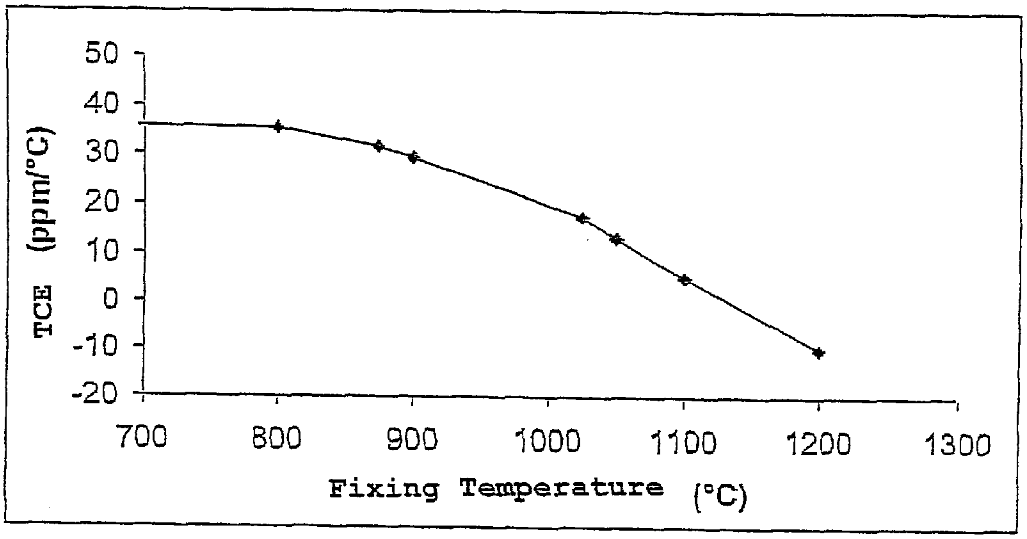
FIG. 1 shows a graph of TCE (ppm/° C.) charted with respect to the fixing temperature (° C.).

The alloy from which the spiral spring forming the subject matter of the invention is made has several advantages.

The Hf is in solid solution in the Nb over a very wide concentration range (up to 30 at %).

The contribution by the Hf to the positive TCE is very large, so that small proportions of Hf are needed. Thus, approximately 2 at % of Hf is sufficient to make the TCE positive. It has turned out, after testing, that an Nb/4 at % Hf alloy possesses a TCE of 13 ppm/° C. after partial recrystallization, which corresponds very well to the acquired values in the case of a balance-spiral spring system.

With this Nb/4 at % Hf alloy, the TCE adjustment is easier to control because:

1) the variation in TCE during recrystallization is only 50 ppm/° C., i.e. three times less than in the case of an Nb—Zr alloy;

2) since the recrystallization is not initiated by precipitation, it is slower and takes place over a very broad temperature range (approx. 400° C.) as the appended FIG. 1 shows.

Finally, the low Hf concentration needed to have the required TCE of 13 ppm/° C. improves the deformability of the spiral spring and makes the drawing operations easier.

The spiral spring made of Nb—Hf alloy may also contain one or more additional elements such as Ti, Ta, Zr, V, Mo, W and Cr in concentrations such that no precipitation takes place during the operation of fixing the spiral shape.

The oxygen proves to have little or no effect on the Nb—Hf spiral spring.

What is claimed is:

1. A self-compensating spiral spring for a mechanical balance-spiral spring oscillator for a watch or clock movement or other precision instrument, made of an Nb—Hf paramagnetic alloy possessing a thermal coefficient of Young's modulus (TCE), such that it enables the following expression $$\frac{1}{E}\frac{dE}{dT} + 3\alpha_s - 2\alpha_b$$

to be substantially equal to zero, where: E: Young's modulus of the spiral spring of the oscillator;

$$\frac{1}{E}\frac{dE}{dT} = TCE = \text{thermal coefficient of Young's modulus of the spiral spring of the oscillator;}$$

$\alpha_s$: thermal expansion coefficient of the spiral spring of the oscillator;

$\alpha_b$: thermal expansion coefficient of the balance the oscillator;

which contains between 2 mol % and 30 mol % Hf, a proportion below the limit above which Hf precipitates.

2. The spiral spring as claimed in claim 1, wherein the alloy includes at least one of the following additional elements: Ti, Ta, Zr, V, Mo, W and Cr in concentrations such that no precipitation takes place during the operation of fixing its shape.

3. The spiral spring as claimed in claim 1, wherein the alloy contains less than 10 mol % Hf.

4. The spiral spring as claimed in claim 2, wherein the alloy contains less than 10 mol % Hf.

* * * * *